United States Patent [19]
Wells

[11] Patent Number: 5,687,617
[45] Date of Patent: Nov. 18, 1997

[54] CUSHION FOR A MOTORCYCLE GEARSHIFT LEVER

[76] Inventor: Anthony L. Wells, 70 Bedok South Road #08-288, Singapore, 1646, Singapore

[21] Appl. No.: 553,920

[22] Filed: Nov. 6, 1995

[51] Int. Cl.$^6$ ........................................ G05G 1/18
[52] U.S. Cl. .................. 74/564; 74/563; 280/231
[58] Field of Search ................. 74/563, 564, 551.8, 74/551.9, 558, 558.5; 280/291, 288.4; 180/219; 362/72, 61

[56] References Cited

U.S. PATENT DOCUMENTS

| | | | |
|---|---|---|---|
| 1,924,031 | 8/1933 | Farrar | 74/564 |
| 2,986,763 | 6/1961 | Williams | 74/564 |
| 4,174,852 | 11/1979 | Panzica et al. | 280/291 |
| 4,591,179 | 5/1986 | Nakamura | 280/291 |
| 4,797,791 | 1/1989 | Burchick | 362/72 |
| 5,042,318 | 8/1991 | Franz | 74/558 |
| 5,125,286 | 6/1992 | Wilson | 74/551.9 |
| 5,222,416 | 6/1993 | Shakhov | 74/564 |
| 5,454,580 | 10/1995 | Lin | 280/291 |
| 5,482,307 | 1/1996 | Lin | 280/291 |

FOREIGN PATENT DOCUMENTS

| | | | |
|---|---|---|---|
| 297009 | 6/1932 | Italy | 74/564 |
| 272719 | 6/1927 | United Kingdom | 74/564 |

*Primary Examiner*—Vinh T. Luong
*Attorney, Agent, or Firm*—Michael I. Kroll

[57] ABSTRACT

A cushion (10) for protecting a motorcycle rider's upper shoe from a motorcycle gearshift lever (16) having a rubber sleeve (17). The cushion (10) has a pad (15), a rigid base plate (13) affixed to a top surface (22) of the pad (15), a pair of spaced apart mounting brackets (14) extending up from a top surface (24) of the base plate (13), and a pair of cable tie wraps (12) for attaching the base plate (13) to the rubber sleeve (17) by inserting the cable tie wraps (12) through the mounting brackets (14) and about the rubber sleeve (17) of the gearshift lever (16). The pad (10) is useful for protecting a motorcycle rider's upper shoe from markings and discomfort caused by contact with the gearshift lever (16).

7 Claims, 2 Drawing Sheets

CUSHION FOR A MOTORCYCLE GEARSHIFT LEVER

BACKGROUND OF THE INVENTION

1. Field of the Invention

The instant invention relates generally to motorcycle gear shifting pads and more specifically it relates to a cushion for a motorcycle gearshift lever.

2. Description of the Prior Art

Motorcycle gear shifting pads at present consist of a simple round rubber sleeve which slips over a steel gearshift lever. While this rubber sleeve acts as an anti-slipping element for a motorcycle rider during a gear change downshifting foot action, it can cause discomfort on the riders upper foot during a gear change upshifting action. Furthermore and inevitably it will ruin the riders upper shoe area when the shift lever and the shoe constantly come in contact during the gear change upshifting action. A shift impression and black marks are left upon the top of the riders shoe as a result of multiple gear change upshifts using the existing motorcycle gear shift rubber sleeve. While these units may be suitable for the particular purpose to which they address, they would not be as suitable for the purposes of the present invention as heretofore described.

SUMMARY OF THE INVENTION

The motorcycle gearshift lever cushion is comprised of a rigid base plate having a pad member securely attached to a bottom surface of the base plate. The pad member which is attached to the bottom surface of the base plate, cushions and distributes evenly over a much wider area the pressure exerted on the top of the motorcycle riders shifting foot and shoe during gear change upshift operations.

Two cable tie wraps that are inserted into two base plate mounting brackets are used to attach the base plate to the rubber sleeve of the motorcycle gearshift lever. These two base plate mounting brackets also allow easy removal and replacement of the retaining cable tie wraps for various reasons. Once inserted through the two base plate mounting brackets, the cable tie wraps can be easily placed about the existing motorcycle gear shift lever rubber sleeve, then strapped together and tightened. The entire attachment procedure requires no tools and can be done in a matter of seconds.

The invention, once fitted over the rubber sleeve of the motorcycle gear shift lever will serve as a preserver against black shoe shifting marks and impressions for the upper foot section of the motorcycle riders shoe which is used for gear shifting. In addition, it also serves as a padding for the top of the motorcycle riders shifting foot, thereby making the gear change upshifting more comfortable and pleasurable for the rider.

A primary object of the present invention is to provide a cushion for a motorcycle gearshift lever that will overcome the shortcomings of the prior art devices.

Another object is to provide a cushion for a motorcycle gearshift lever to totally eliminate the shift impression and black marks which are left upon the top of the motorcycle riders shoe as a result of multiple gear upshifting.

An additional object is to provide a cushion for a motorcycle gearshift lever that will make contact with the top of a riders gear shifting foot, thereby making gear change upshifting more comfortable and pleasurable to the rider during the upshifting action.

A further object is to provide a cushion for a motorcycle gearshift lever that is simple and easy to use.

A still further object is to provide a cushion for a motorcycle gearshift lever that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein.

Similar reference characters denote corresponding features consistently throughout the attached drawings.

DETAILED DESCRIPTION OF THE PREFERRED EMBODIMENTS

Figure 1:
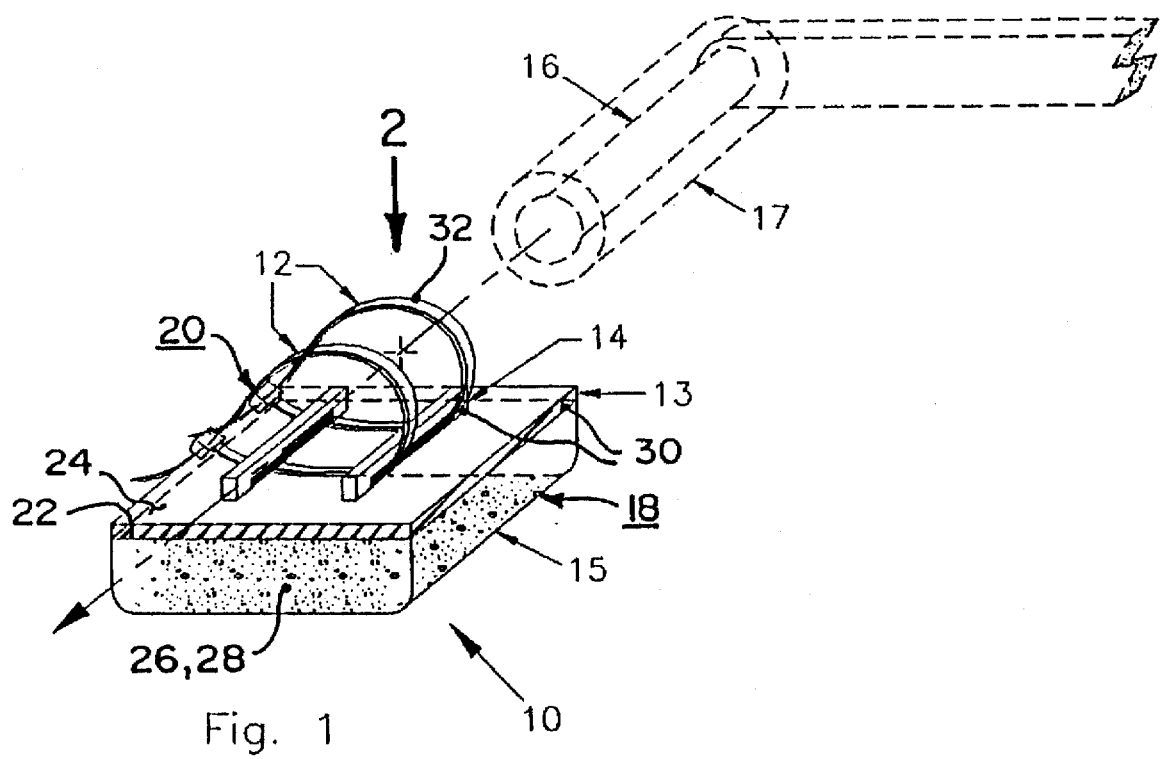
FIG. 1 is a perspective view of the instant invention exploded from the rubber sleeve of the motorcycle gearshift lever, which is shown in dotted lines.
Figure 2:
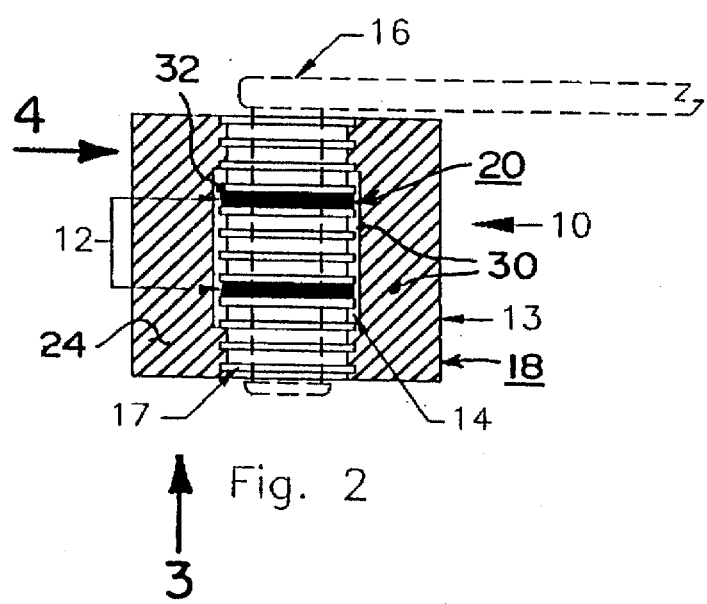
FIG. 2 is a top view taken in the direction of arrow 2 in FIG. 1, with the instant invention installed on the rubber sleeve.
Figure 3:
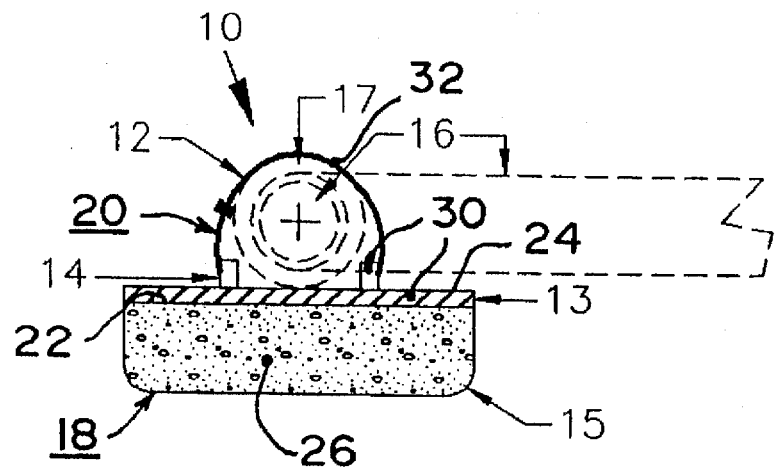
FIG. 3 is a side view taken in the direction of arrow 3 in FIG. 2.
Figure 4:
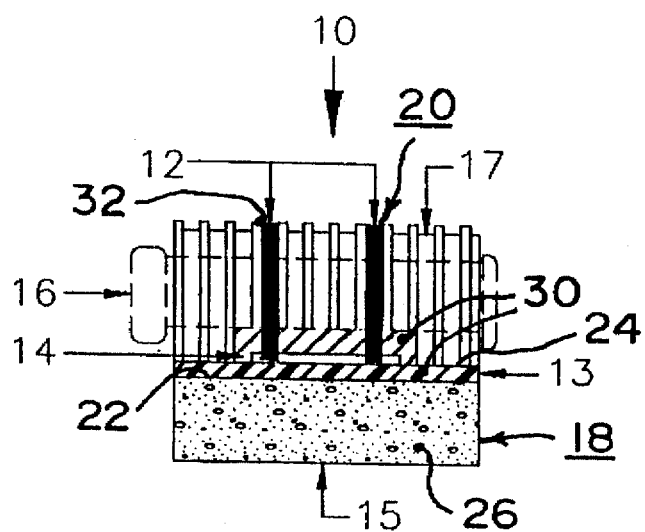
FIG. 4 is a front view taken in the direction of arrow 4 in FIG. 2, with the base plate manufactured out of plastic.

Turning now descriptively to the drawings, in which similar reference characters denote similar elements throughout the several views, FIGS. 1 through 4 illustrate a cushion 10 for a motorcycle gearshift lever 16 having a rubber sleeve 17. The cushion 10 comprises an assembly 18 for protecting a motorcycle riders upper shoe from black shift markings and impressions caused by the gearshift lever 16 making upshifting actions, while insulating an upper portion of the riders foot within the shoe against discomfort and soreness caused by the gearshift lever 16 making multiple upshifting actions. A structure 20 is for securing the protecting assembly 18 to the rubber sleeve 17 of the motorcycle gearshift lever 16.

The protecting assembly 18 is a pad member 15. The protecting assembly 18 further includes a rigid base plate 13 affixed to a top surface 22 of the pad member 15.

The securing structure 20 includes a pair of spaced apart mounting brackets 14 extending up from a top surface 24 of the rigid base plate 13. The securing structure 20 further includes a pair of cable tie wraps 12 that are inserted into the two base plate mounting brackets 14 and about the rubber sleeve 17, so as to attach the base plate 13 to the rubber sleeve 17 of the motorcycle gearshift lever 16, without the aid of special tools.

The pad member 15 can be fabricated out of foam rubber or pliant neoprene material 26. The rigid base plate 13 is fabricated out of a strong durable plastic material 30. Each mounting bracket 14 is fabricated out of the strong durable plastic material 30. The rigid base plate 13 and the mounting brackets 14 are integral and fabricated out of the strong durable plastic material 30. Each cable tie wrap 12 is fabricated out of a flexible plastic material 32.

OPERATION OF THE INVENTION

To use the cushion 10, the following steps should be taken:

1. Affix the rigid base plate 13 to the top surface 22 of the pad member 15 by adhesive or the like.
2. Insert each cable tie wrap 12 into each mounting bracket 14.
3. Extend each cable tie wrap 12 about the rubber sleeve 17 of the motorcycle gearshift lever 16.
4. Tighten and then strap together each cable tie wrap 12 on the rubber sleeve 17, so as to hold the rigid base plate 13 with the pad member 15 thereto.
5. Use the motorcycle gearshift lever 16 in its normal manner.

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A cushion for protecting a motorcycle rider's upper shoe from a motorcycle gearshift lever having a rubber sleeve, said cushion comprising:
   a) a pad member;
   b) a rigid base plate affixed to a top surface of said pad member;
   c) a pair of spaced apart mounting brackets extending up from a top surface of said rigid base plate; and
   d) a pair of cable tie wraps for attaching said base plate to the rubber sleeve by insertion through said mounting brackets and about the rubber sleeve of the gearshift lever.

2. A cushion for a motorcycle gearshift lever as recited in claim 1, wherein said pad member is fabricated out of foam rubber material.

3. A cushion for a motorcycle gearshift lever as recited in claim 1, wherein said pad member is fabricated out of a pliant neoprene material.

4. A cushion for a motorcycle gearshift lever as recited in claim 1, wherein said rigid base plate is fabricated out of a plastic material.

5. A cushion for a motorcycle gearshift lever as recited in claim 1, wherein each said mounting bracket is fabricated out of a plastic material.

6. A cushion for a motorcycle gearshift lever as recited in claim 1, wherein said rigid base plate and said mounting brackets are integral and fabricated out of a plastic material.

7. A cushion for a motorcycle gearshift lever as recited in claim 1, wherein each said cable tie wrap is fabricated out of a flexible plastic material.

* * * * *